United States Patent [19]
Belser et al.

[11] Patent Number: 5,103,362
[45] Date of Patent: Apr. 7, 1992

[54] METHOD OF ELECTROSTATICALLY SENSING TRACK POSITION INFORMATION FOR MAGNETIC RECORDING MEDIUM

[75] Inventors: Karl A. Belser, Los Gatos; Rodney J. Whitefield, San Jose, both of Calif.

[73] Assignee: International Business Machines Corporation, Armonk, N.Y.

[21] Appl. No.: 492,689

[22] Filed: Mar. 13, 1990

[51] Int. Cl.$^5$ .......................... G11B 13/00; G11B 5/74
[52] U.S. Cl. .................................. 360/131; 360/77.03; 360/134; 360/135; 369/14; 369/126
[58] Field of Search ...................... 360/77.03, 131, 134, 360/135; 369/14, 15, 126

[56] References Cited

U.S. PATENT DOCUMENTS

| | | | |
|---|---|---|---|
| 4,106,107 | 8/1978 | Goodman | 369/126 |
| 4,340,953 | 7/1982 | Iwamura et al. | 369/126 |
| 4,489,278 | 12/1984 | Sawazaki | |
| 4,556,597 | 12/1985 | Best et al. | 369/14 |
| 4,592,041 | 5/1986 | Senzaki et al. | 369/126 |
| 4,843,494 | 6/1989 | Cronin et al. | 360/77.03 |
| 4,860,277 | 8/1989 | Wisseroth et al. | 369/126 |
| 4,961,123 | 10/1990 | Williams et al. | 360/77.03 |

FOREIGN PATENT DOCUMENTS 62-51022 3/1987 Japan.

Primary Examiner—Aristotelis Psitos
Assistant Examiner—David L. Robertson
Attorney, Agent, or Firm—Henry E. Otto, Jr.

[57] ABSTRACT

Storage capacity of a magnetic recording medium is increased by providing a nonconductive layer over a magnetic layer on which magnetic data is writable in a series of recording tracks, and applying a pattern of electrostatic charges to the nonconductive layer above at least one of the recording tracks to write track-position-denoting servo information in overlying relation to magnetic data. The pattern may be applied by electrostatic charges selectively of negative or positive polarity that are imprinted while the medium is in a mold or advanced over an electro-photographic charge transfer drum, for thereby preprinting the pattern as a step in fabrication of the medium.

13 Claims, 2 Drawing Sheets

METHOD OF ELECTROSTATICALLY SENSING TRACK POSITION INFORMATION FOR MAGNETIC RECORDING MEDIUM

This invention relates to a method for providing a storage medium with increased storage capacity, and more particularly to an improved method which achieves this increase by writing servo information as charge patterns at the same positions as magnetic data along recording tracks of a magnetic recording medium, such as a disk or tape.

BACKGROUND OF THE INVENTION

Two approaches have heretofore been used to provide position information directly at the same position as magnetic data along a track of a magnetic recording disk. These involve magnetic buried servo information and capacitively buried servo information. The magnetic buried servo approach is not practical because of data-to-servo interference. While this interference can be eliminated with azimuth recording (i.e., by recording data at one angle, such as 15°, and the servo pattern at another angle, such as −15°), the requisite thin film azimuth recording heads are very difficult to fabricate. The capacitive buried servo approach is relatively complex and costly; and while it is economically feasible for files using large diameter disks providing substantial storage capacities, it is not economical and/or feasible for files using smaller disks.

The most pertinent prior art of which applicants are aware is the unexamined Japanese Patent Application published Mar. 5, 1987 as 62-51022 in the Patent Abstracts of Japan. This application discloses a flexible magnetic recording medium in which concentric grooves are formed in a flexible polyester substrate. Copper pieces are embedded in these grooves by electroless copper plating. Track sector and servo information is encoded by the electrostatic capacitance of the copper pieces; whereupon a magnetic layer overcoat is applied for recording magnetic indicia in superposed relationship over the electrostatic servo pattern. Grooving and then inserting conductive elements in the grooves lithographically requires an undesirable number of fabrication steps. Moreover, the conductive servo pattern elements are not charged. To be sensed, they must be used as capacitive elements in some sort of tuned circuit, such as a pair of sensing electrodes, as the metallic elements of the pattern do not seem to be electrically connected to ground. The sensing circuit must be an active circuit having a high frequency carrier. If track densities of 2,000 tracks per inch are to be attained, radio frequencies in excess of 100 MHz may be required; and in such case, the capacitance of the metallic pattern elements would detune the radio frequency sensing circuit or unbalance a bridge circuit. The modulation envelope of the carrier frequency would then need to be detected, filtered and converted into a position sensing servo signal.

This approach to signal processing is thus very expensive and complicated. In fact, applicants' assignee experimented with a capacitive buried servo approach using patterns similar to those described in this unpublished Japanese application. While it was a technical success, it was never implemented commercially because it greatly and undesirably increased disk file cost.

Of incidental interest is U.S. Pat. No. 4,489,278 which discloses a voltage detecting device that uses an insulating film made of a material such as Teflon* material capable of storing electrostatic charges applied over a conductive layer of a recording medium. However, there is no teaching of superimposing electrostatic charge patterns over, under or in between magnetic indicia.

*Trademark of E. I. DuPont deNemours & Company

There is a need for an improved, cost-efficient method of increasing the storage capacity of a magnetic recording medium by use of an improved position sensing system.

SUMMARY OF THE INVENTION

Toward this end, and according to the invention, storage capacity of a magnetic recording medium is increased by providing a more accurate position sensing system that allows the data tracks to be more closely spaced. This invention consists of a nonconductive layer over, under or interspersed with a magnetic layer on which magnetic data is writable in a series of recording tracks, and applying a pattern of electrostatic charges to the nonconductive layer above each of the recording tracks to write track-position-denoting servo information in overlying relation to magnetic data. The pattern may be applied by electrostatic charges selectively of negative or positive polarity that are imprinted while the medium is in a waffle-like mold or advanced over an electrical charge transfer roller or drum, for thereby preprinting the pattern as a step in fabrication of the medium.

Alternatively, the improved method for increasing storage capacity may be achieved by providing a magnetic recording medium comprising a coating including a mixture of magnetic recording particles and particles of a material capable of storing charge, and writing magnetic indicia using the magnetic particles on selected ones of said tracks, after applying a pattern of electrostatic charges to the coating to write servo information in overlying relation to the magnetic indicia on said tracks.

DESCRIPTION OF PREFERRED EMBODIMENTS

Figure 1:
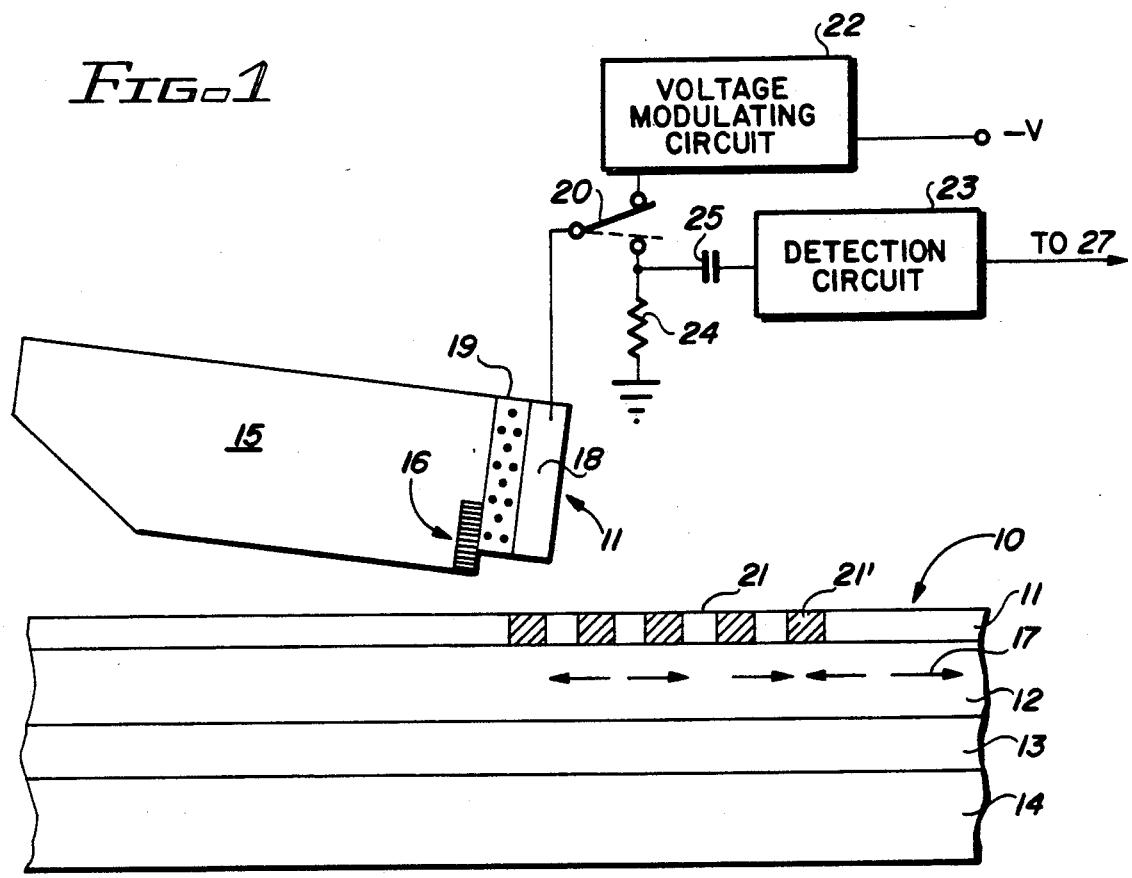
FIG. 1 is a schematic view of an apparatus for selectively applying a servo pattern of electrostatic charges to a magnetic recording disk and thereafter detecting said pattern on the disk.

As illustrated in FIG. 1, and according to the invention, a rigid magnetic recording disk 10 comprises a layer 11 of a suitable material, such as Teflon material or the like, for storing electrostatic charges. Layer 11 overlies a layer 12 of magnetic recording material. An optional planarization layer 13 of epoxy-phenolic with a TiO$_2$ filler or the like may underlie the magnetic layer 12 to assure that it is applied to an ultra-smooth surface. A conductive substrate 14 of AlMg or the like underlies the planarization layer 13 (or magnetic layer 12) for supporting layers 11, 12 and 13.

Disk 10 is suitably rotated by means (not shown) relative to an air-bearing slider 15 that flies in conventional manner in close proximity over the disk. Mounted on slider 15 is a thin film head 16 for writing and reading magnetic indicia, such as 17, in conventional fashion by means (not shown) not related to the present invention.

According to the invention, slider 15 comprises a conductive probe 18 that is aligned with and very close to, but separated from, head 16 by a nonconductive area 19. A switch 20, when in the position shown in FIG. 1, is conditioned to enable probe 18 to apply a servo pattern 21 of electrostatic charges, preferably in the form of negatively charged regions 21', to charge storage layer 11 of disk 10. This servo pattern is applied, in overlying relation to recording tracks on the disk, by connecting a voltage source $-V$ via a voltage modulating circuit 22 and switch 20 to probe 18.

After the servo pattern is initially applied, switch 20 is moved to the position denoted by dashed lines to enable the servo pattern, in the form of pulses, to be read by a detection circuit 23. Circuit 23 may, for sake of illustration, comprise a field effect transistor (FET) voltage preamplifier (not shown) to amplify pulses of the pulse stream having a preselected threshold level as sensed by probe 18. An optional R-C coupling network, comprising a resistor 24 and a capacitor 25, is preferably associated with the detection circuit.

Figure 2:
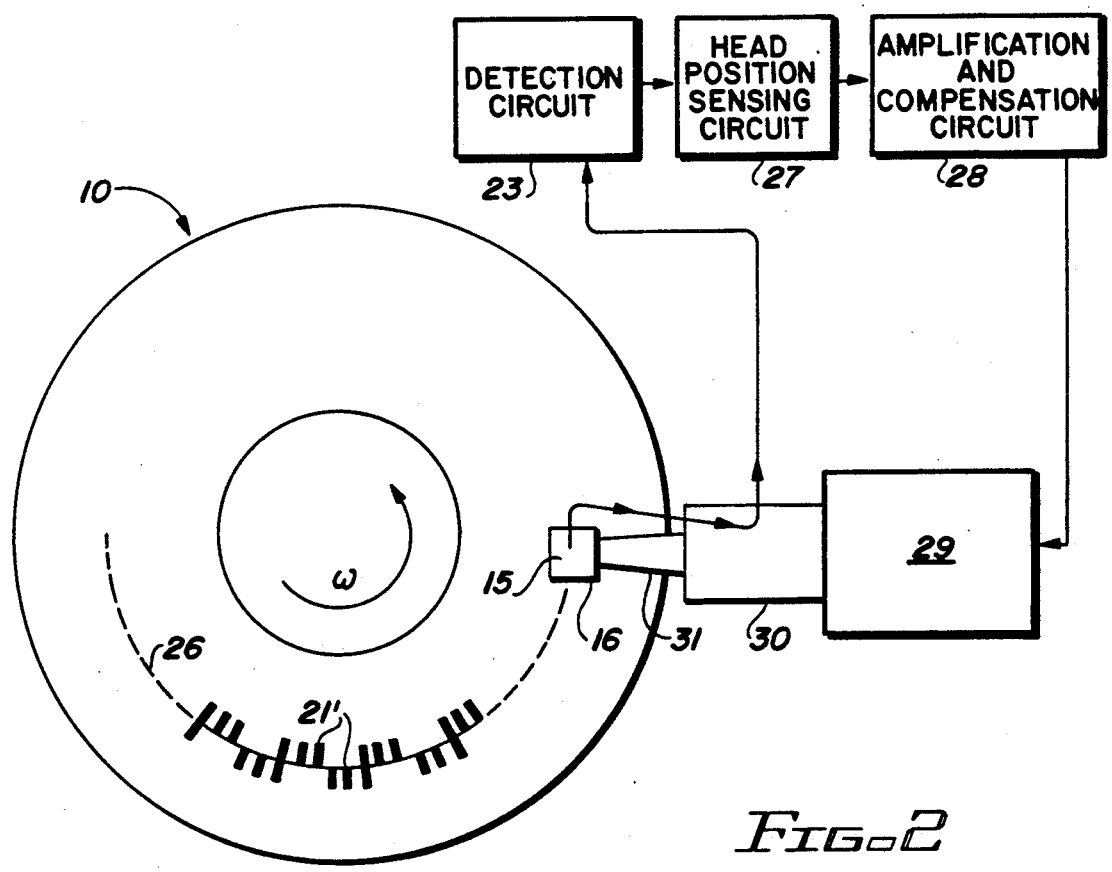
FIG. 2 is a top view of a portion of the apparatus shown in FIG. 1.

As best shown in FIG. 2, the servo pattern of electrostatic charges comprises a series of negatively charged regions 21' arranged in layer 11 in staggered consecutive fashion to either side of the centerline 26 of a respective magnetic recording track on the disk. The amplified signal from detection circuit 23 is transmitted to a head position sensing circuit 27 that senses the servo pattern. If magnetic head 16 is to the right (or left) of the centerline 26 of a selected magnetic recording track, the negatively charged regions 21' to the right (or left) of the centerline will cause circuit 27 to provide a corresponding output signal to an amplification and compensation circuit 28 that fine tunes the position of an actuator 29 that supports an arm 30, suspension 31, slider 15 and thus magnetic head 16 so that the sensed output signal from 28 is nulled, thereby denoting that the magnetic head is aligned with the centerline 26 of the selected track.

Figure 3:
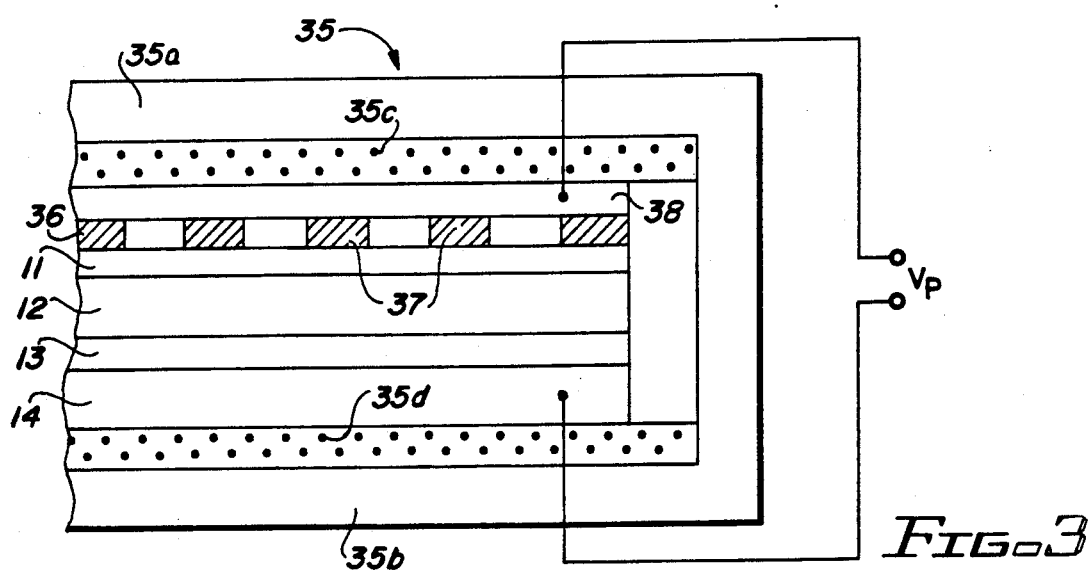
FIG. 3 is a fragmentary sectional view of a waffle-iron-like apparatus for preprinting the servo pattern of electrostatic charges on the magnetic recording medium by electrical discharge.

According to a feature of the invention, and as illustrated in FIG. 3, the servo pattern of electrostatic charges 21' desirably can be preprinted as part of the disk fabrication process. This is achieved by centering disk 10 in a waffle-iron-like mold 35 or the like, comprising two mating sections 35a,35b preferably having insulating layers or coatings 35c,35d on their facing lower and upper surfaces, respectively. A patterned insulating layer 36 of glass, Al$_2$O$_3$ or the like, is placed in contact with charge storage layer 11. Layer 36 has a series of cutout regions positioned so as to leave insulating elements 37 arranged in a patterned array preselected to define regions where storage of electrostatic charge is not desired. A metal plate or plate 38 of other suitable conductive material is placed atop insulating layer 36; and, while pressure is applied to said plate by closure of the top section 35a of the mold, a voltage Vp is applied between substrate 14 and the plate. This causes an image pattern of electrostatic charges to be deposited in the desired preselected pattern defined by the gaps where the insulating elements are absent.

The recording medium has thus far been described as a hard or rigid disk 10 with a conductive substrate 14 that served as the ground printing electrode. The recording medium may, if preferred, be a flexible or so-called floppy disk or a flexible magnetic tape, in which case an external grounding electrode would be required to take the place of conductive substrate 14 (or, though not as desirable, the disk or tape could be reconfigured to provide an integral grounding layer).

Figure 4:
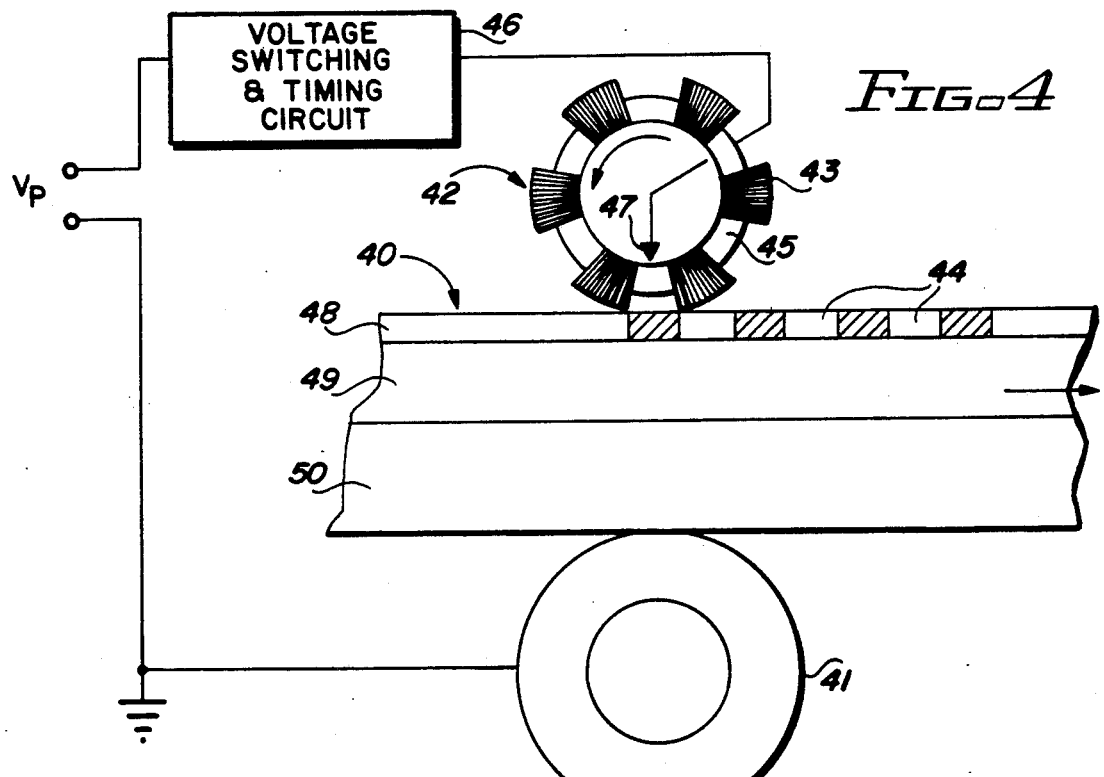
FIG. 4 is a schematic view of apparatus for applying a servo pattern of electrostatic charges to a flexible magnetic recording tape by contact electrical charge transfer printing.
Figure 5:
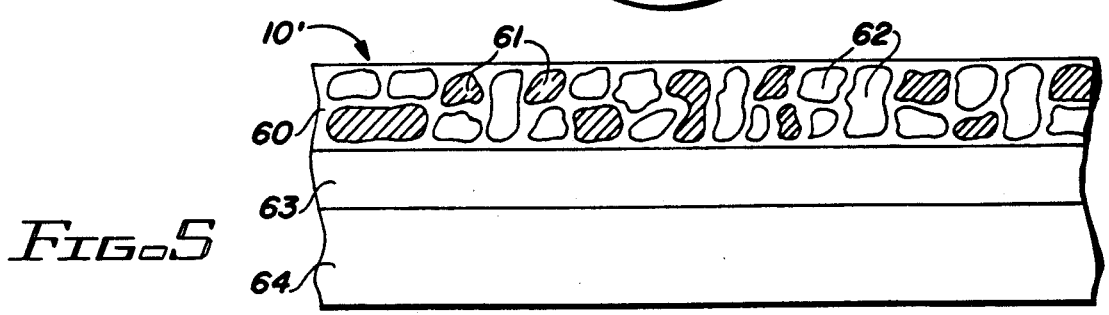
FIG. 5 is an elevational sectional view of a magnetic recording medium coated with a mixture of particles of magnetic recording material and charge storage material which may be used to implement the invention.

If preferred, the servo pattern of electrostatic charges may be applied as illustrated in FIG. 4. A flexible magnetic recording tape 40 is advanced between a drive roller 41 and a commutator-like print roller 42. Roller 42 has insulating elements 43, which like insulating elements 37 of FIG. 3, are arranged in an array pattern preselected to define regions 44 where storage of electrostatic charge is not desired. These insulating elements 43 protrude radially from a tube or layer 45 of a suitable conductive material. As tape 40 is moved through roller 42, a potential Vp is applied between rollers 41,42 under control of a voltage switching and timing circuit 46, while a sliding electrical contact 47 makes contact with the inner surface of conductive tube 45. The servo pattern can thus be applied to charge storage layer 48 by charge transfer printing prior to writing any magnetic indicia on magnetic layer 49 of the tape.

As thus far described, it has been assumed that the base or substrate layer 50 of tape 40 is nonconductive, and that roller 41 must therefore be electrically connected to the voltage switching/timing circuit 46 to serve as a ground electrode. However, if substrate layer 50 has an integral conductive layer, roller 41 may be dispensed with or merely be a nonconductive drive roller.

Also, if preferred, roller 41 may be replaced with an electro-photographic drum which, similar to a laser printer, would transfer the pattern of electrostatic charges to the charge storage layer 48.

According to a variation of the invention, magnetic recording medium 10' may comprise (in lieu of a separate charge storage layer 11 and a separate magnetic recording layer 12) a composite layer 60 comprising particles 61 of charge storage material and particles 62 of magnetic recording material. Layer 60 is applied with or without a planarization layer 63, to a conductive substrate 64.

The charge division between a conducting substrate 14 and probe 18 depends upon the relative distances of the charge from the substrate and probe; and the substrate should be kept far away from the charged surface for optimal signal-to-noise ratio. The voltages required to deposit charge for a probe 18 in close proximity (e.g., 10 micro inches) from the charged surface are relatively low (about 10 volts); whereas about 1000 volts is required at a spacing of 1000 micro inches. Thus, with the electrode in close proximity, relatively low voltages can be used to charge the charge storage material, even at relatively high charging rates. The electrostatic charge patterns on Teflon FEP charge storage films were found to exhibit decay time constants of about 200 years at room temperature. The charges 21' may be surface charges; or, if preferred, the charges may be embedded into the insulating storage layer 11 by annealing at temperatures of between 100°–200° C.

As earlier noted, the charge storage layer may be of Teflon material; however, any other material may be used that will satisfactorily store electrostatic charges. The charge pattern can be written on layer 11 using the same servo writers that are presently used to write servo patterns on hard disks. As earlier stated, the conductive probe 18 and magnetic recording head 16 would be positioned in very close proximity on slider 15. Hence, no new manufacturing tooling would be required. While the stored charge may be of either negative or positive polarity, it is preferably of negative polarity because the latter provides the longest storage time.

While the invention has been shown and described with respect to preferred embodiments thereof, it will be understood by those skilled in the art that changes in form and detail may be made in these embodiments without departing from the scope and teaching of the invention. Accordingly, the apparatus and method herein disclosed are to be considered merely as illustrative, and the invention is to be limited only as specified in the claims.

We claim:

1. A method for providing a storage medium of increased storage capacity, comprising the steps of:
    providing a magnetic layer on which magnetic data are writable in a series of recording tracks;
    providing over the magnetic layer a nonconductive layer of a material capable of storing electrostatic charges; and
    applying a pattern of electrostatic charges to the nonconductive layer above at least one of the recording tracks to write position-denoting servo information in overlying relation to magnetic data.

2. The method of claim 1, including, during the applying step, imprinting said pattern with charges selectively of negative or positive polarity while the medium is in a mold or the like, for thereby applying the pattern as a step in the fabrication of the medium.

3. The method of claim 1, including the steps of:
    writing the charges with a probe closely adjacent and aligned with a magnetic recording head that senses the magnetic indicia; and
    sensing said charges with said probe to denote position of said head relative to the centerline of a respective recording track.

4. The method of claim 1, wherein during the applying step, the charge patterns are written by contact electrical charge transfer printing prior to the writing of the magnetic data.

5. The method of claim 1, wherein the recording medium is a rigid disk, having a conductive substrate that serves, during the applying step, as a ground electrode.

6. The method of claim 1, wherein the recording medium is a flexible disk, and including the step of providing, for use in the applying step, a means constituting a ground electrode.

7. The method of claim 1, wherein the recording medium is a flexible tape, and including the step of providing, for use in the applying step, a means constituting a ground electrode.

8. The method of claim 1, wherein the charge storage layer is deposited directly on the magnetic layer.

9. The method of claim 1, including the step of providing a planarizing layer between the magnetic layer and a conductive substrate.

10. A method of providing a magnetic recording medium of increased storage capacity, comprising the steps of:
    providing a nonconductive substrate;
    providing on the substrate a coating comprising a mixture of magnetic recording particles and particles of a material capable of storing electrostatic charges;
    applying a pattern of electrostatic charges to the coating to write position-denoting servo information in overlying relation to tracks on which magnetic indicia are recordable; and
    writing magnetic indicia on selected tracks using magnetic particles.

11. The method of claim 10, including the step of applying a thin layer substantially of only the charge storage material over said coating.

12. The method of claim 10, wherein during the applying step, the charge patterns are written by contact electrical charge transfer printing prior to the writing of the magnetic data.

13. A method for providing a storage medium of increased storage capacity, comprising the steps of:
    providing a magnetic layer on which magnetic data are writable in a series of recording tracks;
    providing over the magnetic layer a nonconductive layer of a material capable of storing electrostatic charges;
    applying a pattern of electrostatic charges to the nonconductive layer above at least one of the recording tracks to write position-denoting servo information in overlying relation to magnetic data; and
    annealing the nonconductive charge storage layer to embed the charges therein.

* * * * *